Patented Aug. 5, 1930

1,772,218

UNITED STATES PATENT OFFICE

CHARLES ALBERT HOUQUES-FOURCADE, OF BORDEAUX, FRANCE

METHOD FOR THE MANUFACTURE OF SEA CAOUTCHOUC

No Drawing. Application filed October 8, 1927, Serial No. 225,031, and in France October 9, 1926.

The present invention has for its object a manufacturing process for making caoutchouc and utilizing wrack, sea-weeds and other sea grass as starting material, and in such a manner that the process be economical and yield sufficient benefit. According to the invention, the sea caoutchouc is extracted from the sap contained in the sea plants, by treating consequently all the sea-weeds, which although of different forms all contain sap, but by treating particularly the weeds known as the Laminaria and the giant kelp of California.

Due to the ever increasing india rubber consumption, the present invention offers great advantages, since huge quantities of sea caoutchouc may be manufactured at a very low cost price and same is susceptible of being substituted to common caoutchouc in its various applications and especially in the manufacture of motor car tires, artificial leather, linoleum, constructional pieces, etc.

For the obtention of the caoutchouc according to the invention, one of the following ways of working may be followed:

One way of working consists in dissolving the sea weeds with water in heated boilers, preferably water containing alkaline, such as Solvay soda carbonate in the proportion of 5 to 10% of the weight of the sea weeds. When the dissolution is completed, the material obtained is placed in a rotary sieve which leaves passage only to the liquid part and thus the non-dissolved parts or foreign substances are eliminated.

The viscous liquid obtained is then placed into a kneading mixer or a high speed centrifuge, and a solution of sulphur of chloride with carbon disulphide carbon tetrachloride, benzene or other solving agent for sulphur in a proportion of 2 to 2.5%, this proportion of sulphur dichloride varies according to the species of the sea weeds employed.

Sulphur dichloride might be employed single, but it has been found preferable to make use of a solution of this sulphur dichloride which allows of the obtainment of a product having a better appearance.

After kneading for some time, the substance becomes livered and the elastic flaky dough obtained is then centrifugalized.

The resulting dough, which is sea caoutchouc, can be manufactured, pressed, made into bars, drawn into wires and it may be given any desired shape such as are made use of in the caoutchouc industry.

Another way of working differs from the preceding in this that after complete dissolution of the sea weeds and separation of the liquid parts, the dough is poured rapidly, at a temperature above 113° C., into a tank containing sulphur, in the proportion of 5 to 10% of sulphur, if soft caoutchouc is to be obtained; for the obtainment of harder caoutchouc the proportion is increased,—the liquid and sulphur are stirred together for a suitable lapse of time, the progress of the operation being apparent by the thickening of the mixture, and an india rubber dough is obtained as in the preceding case.

According to a third process, after dissolving and separating the liquid parts, these are poured into a high speed centrifuge and, by adding simultaneously a coagulating reagent for colloids such acetic acid, a coagulum is obtained which is in turn treated with sulphur dichloride as in the first process, or by sulphur as in the second way of working.

It is to be noticed that sulphur dichloride could be replaced by antimony sulphide or other sulphur compound.

Another method consists, after dissolving and separating the liquid parts, in diffusing into the dough simultaneously or in succession, sulphur dioxide and hydrogen sulphide.

The substance obtained is similar to the common caoutchouc, it can be vulcanized as the latter, but of course the temperature and vulcanizing duration may vary according to the species of the sea weeds employed which can be widely different the ones from the others.

According to the above mentioned processes, it is of no importance that the caoutchouc producing sea weeds be selected when they are mixed with caoutchouc non-yielding sea weeds, since their separation takes place automatically.

A cold process could also be used in which the sea weeds would be crushed, for instance in a grind stone crusher, with water containing alkaline or not, the separation taking place afterwards.

An advantage of the process resides in that the water which has been in contact either with the sea weeds or with the dough can be collected, for the extraction of all the salts contained in the sea weeds, such as: potassium, chloride, and sodium chloride, and especially iodine, which constitutes a source of large profits.

Obviously the qualities (color, elasticity, compression) of the caoutchouc obtained, will vary according to the coagulating process employed, centrifugation or coagulating reagents, way of manufacturing of the caoutchouc, and whether sulphur, sulphur dichloride, antimony trisulphide, hydrogen sulphide, sulphur dioxide or any other sulphur compound, is used, but, in all cases, the sea caoutchouc may be employed, either pure or mixed with common caoutchouc.

Various detail modifications may of course be made in the above described processes without departing from the scope of the invention, and, in particular, linseed oil, olive oil, etc. could be incorporated to the solution containing sea weeds; similarly, and in order to eliminate the excess of sulphur or the chlorhydric acid produced during the treatment, the dough could be worked with acetone, carbone disulphide, benzene, carbon tetrachloride, etc. To insure a perfect preserving of the manufactured articles, the dough from which these articles are made could be mixed with a solution of anilin or phenol at 3%, of glycerin and gelatin at 5% and eventually with potassium dichromate, formol or tannin.

Having now described my invention, what I claim as new and desire to secure by Letters Patent is:

1. Method for the manufacture of a plastic material from sea-weeds which consists in treating sea-weeds with alkalized water, eliminating the nondissolved parts of the mass thus obtained and treating the remaining viscous mass with a sulphur vulcanizing material.

2. Method for the manufacture of a plastic material from sea-weeds which consists in treating sea-weeds with alkalized water, eliminating the nondissolved parts of the mass thus obtained and treating the remaining viscous mass with a material containing sulphur.

3. Method for the manufacture of a plastic material from sea-weeds which consists in treating sea-weeds with alkalized water, eliminating the nondissolved parts of the mass thus obtained and treating the remaining viscous mass with sulphur dichloride.

4. Method for the manufacture of a plastic material from sea-weeds which consists in treating sea-weeds with alkalized water, eliminating the nondissolved parts of the mass thus obtained and treating the remaining viscous mass with a solution of sulphur dichloride.

5. Method for the manufacture of a plastic material from sea-weeds which consists in treating sea-weeds with alkalized water, eliminating the nondissolved parts of the mass thus obtained, treating the remaining viscous mass with an acid coagulating reagent and treating the coagulum thus obtained with a sulphur vulcanizing material.

6. Method for the manufacture of a plastic material from sea-weeds which consists in treating sea-weeds with alkalized water, eliminating the nondissolved parts of the mass thus obtained, treating the remaining viscous mass with acetic acid and treating the coagulum thus obtained with a sulphur vulcanizing material.

7. Method for the manufacture of a plastic material from sea-weeds which consists in treating sea-weeds with alkalized water, eliminating the nondissolved parts of the mass thus obtained, treating the remaining viscous mass with an acid coagulating reagent in a centrifugal apparatus and treating the coagulum thus obtained with a sulphur vulcanizing material.

8. Method for the manufacture of a plastic material from sea-weeds which consists in treating sea-weeds with alkalized water, eliminating the nondissolved parts of the mass thus obtained, treating the remaining viscous mass with an acid coagulating reagent, mixing the coagulated mass with vegetable oils and treating this mixture with a sulphur vulcanizing material.

9. Method for the manufacture of a plastic material from sea-weeds which consists in treating sea-weeds with alkalized water, eliminating the nondissolved parts of the mass thus obtained, treating the remaining viscous mass with a sulphur vulcanizing material and eliminating the excess of sulphur vulcanizing material from the mass finally obtained.

10. Method for the manufacture of a plastic material from sea-weeds which consists in treating sea-weeds with alkalized water, eliminating the nondissolved parts of the mass thus obtained, treating the remaining viscous mass with a sulphur vulcanizing material and adding a solution of a preserving substance to the mass finally obtained.

In testimony whereof I have signed my name to this specification.

CHARLES ALBERT HOUQUES-FOURCADE.